(12) United States Patent
Inadome

(10) Patent No.: US 11,014,480 B2
(45) Date of Patent: May 25, 2021

(54) HEADREST

(71) Applicant: TOYOTA BOSHOKU KABUSHIKI KAISHA, Aichi-ken (JP)

(72) Inventor: Seiichirou Inadome, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 14 days.

(21) Appl. No.: 16/745,794

(22) Filed: Jan. 17, 2020

(65) Prior Publication Data

US 2020/0238871 A1 Jul. 30, 2020

(30) Foreign Application Priority Data

Jan. 24, 2019 (JP) .............................. JP2019-010012

(51) Int. Cl.
 *B60N 2/841* (2018.01)
 *B60N 2/859* (2018.01)
 *B60N 2/856* (2018.01)

(52) U.S. Cl.
 CPC ............. *B60N 2/856* (2018.02); *B60N 2/841* (2018.02); *B60N 2/859* (2018.02)

(58) Field of Classification Search
 CPC ......... B60N 2/841; B60N 2/856; B60N 2/859
 USPC ................................................. 297/403, 408
 See application file for complete search history.

(56) References Cited

U.S. PATENT DOCUMENTS

| | | | | |
|---|---|---|---|---|
| 5,664,841 A * | 9/1997 | Dal Monte | ............. | B60N 2/62 297/408 |
| 7,325,877 B2 * | 2/2008 | Brockman | ............. | B60N 2/844 297/408 |
| 7,575,282 B2 * | 8/2009 | Sutter, Jr. | ............... | B60N 2/876 297/403 |
| 7,717,516 B2 * | 5/2010 | Sutter, Jr. | ............... | B60N 2/856 297/403 |
| 8,002,356 B2 * | 8/2011 | Lutzka | ................... | B60N 2/844 297/408 |

(Continued)

FOREIGN PATENT DOCUMENTS

| | | | | |
|---|---|---|---|---|
| CA | 2436004 A1 * | 8/2002 | ............... | B60N 2/20 |
| CA | 2418563 A1 * | 8/2003 | ............. | B60N 2/856 |

(Continued)

OTHER PUBLICATIONS 4 page PDF of machine translation of FR 2556195-A1 to HATTA. (Year: 1985).*

*Primary Examiner* — Robert Canfield
(74) *Attorney, Agent, or Firm* — Greenblum & Bernstein, P.L.C.

(57) ABSTRACT

A headrest can be pivoted between a use state and a retracted state. The headrest has a pivot shaft pivotally supported to an upper part of a back frame. Opening ends of the headrest frame are connected to the pivot shaft. A locking mechanism is provided on the pivot shaft between the ends of the headrest frame. The lock mechanism includes right and left lateral wall portions into which the pivot shaft is inserted. Right and left lateral plate portions are connected to the pivot shaft between the right and left lateral wall portions. The headrest frame is pivotally biased toward the retracted position by a pivot member biasing spring. The locking mechanism may have a columnar member. The columnar member may approach the pivot shaft while maintaining a parallel state with the pivot shaft.

19 Claims, 8 Drawing Sheets

(56) References Cited

U.S. PATENT DOCUMENTS

| | | | | |
|---|---|---|---|---|
| 8,197,007 B2* | 6/2012 | Lutzka | ............ | B60N 2/844 |
| | | | | 297/408 |
| 8,465,098 B2* | 6/2013 | Yetukuri | ............ | B60N 2/856 |
| | | | | 297/408 |
| 8,511,751 B2* | 8/2013 | Bruck | ............ | B60N 2/856 |
| | | | | 297/408 |
| 9,688,172 B2* | 6/2017 | Nilsson | ............ | B60N 2/856 |
| 2008/0036263 A1* | 2/2008 | Little | ............ | B60N 2/856 |
| | | | | 297/409 |

FOREIGN PATENT DOCUMENTS

| | | | |
|---|---|---|---|
| FR | 2556195 A1 * | 6/1985 | ......... B60N 2/865 |
| JP | 2018-103701 | 7/2018 | |

* cited by examiner

HEADREST

CROSS-REFERENCE TO RELATED APPLICATIONS

This application claims priority to Japanese patent application serial number 2019-010012 filed Jan. 24, 2019, the contents of which is incorporated herein by reference in its entirety for all purposes.

BACKGROUND

The present disclosure relates to a headrest used for a vehicle seat.

A retractable headrest for a vehicle seat can be pivoted with respect to a seatback between a use position and a retracted position. A head support surface of the headrest, which comes in contact with a head of a seated occupant in the use position, is oriented forward. In the retracted position, the head support surface faces a seating surface of the seatback. The headrest disclosed in Japanese Laid-Open Patent Publication No. 2018-103701 includes a headrest frame in an inverted-U shape. The frame is configured as a skeleton member of a head support portion. A pair of right and left pivotal brackets is provided at open ends of the headrest frame. The headrest is pivotal with respect to a pair of right and left fixing brackets about a pivot shaft. A rod-shaped locking member is provided for supporting the headrest at a predetermined angle. The locking member is engaged with a lateral wall of the right and left fixing brackets and a lateral wall of the right and left pivotal brackets, so as to support the headrest at the predetermined angle.

According to the above-described publication, the length of the locking mechanism must be a length corresponding an interval between the open ends of the headrest frame. Because of this structural limitation, it is difficult to maintain the locking member in a parallel position while moving, thereby making it difficult to allow the locking member to be laterally engaged and locked with the pivot shaft in an even manner.

Therefore, there has been a need for a retractable headrest having a simple structure that can securely lock a pivotal motion of a headrest frame at least in a use position.

SUMMARY

According to one aspect of the present disclosure, a headrest is attached to a vehicle seat so that it can be pivoted between a use state and a retracted state. The headrest includes a pivot shaft extending in a seat width direction. The pivot shaft is directly or indirectly supported by an upper part of the seatback frame in a pivotal manner. The headrest includes a headrest frame and a locking mechanism. The headrest frame has substantially an inverted-U shape and includes left and right ends connected to the pivot shaft. The locking mechanism is provided on the pivot shaft between the left and right ends of the headrest frame. The locking mechanism includes left and right fixed walls through which the pivot shaft extends. The locking mechanism also includes left and right pivotal walls connected to the pivot shaft. The left and right fixed walls are directly or indirectly fixed to the upper part of the seatback frame and extend in a direction perpendicular to the seat width direction. The left and right pivotal walls are located on an inner side of the left and right fixed walls and extend in parallel to the left and right fixed walls. Further, the locking mechanism includes a locking member and a bias spring. The locking member is configured to lock the left and right pivotal walls to the left and right fixed walls so as to not pivot at least when in the use position. The bias spring pivotally biases the headrest frame in a direction toward the retracted position. The locking member has a rod shape and is movably supported with respect to the left and right fixed walls while being maintained in parallel with the pivot shaft. When the locking member approaches the pivot shaft, the locking member comes in contact with a part of the left and right fixed walls and a part of the left and right pivotal walls. Consequently, the headrest is locked in a non-pivotal manner by the locking member.

Therefore, the locking member can be shortened to have a length that is less than an interval between the inner surfaces of the left and right ends of the headrest frame in the width direction. The length of the locking member is thus less than the length extending between the left and right ends of the headrest frame. As a result, the locking member can easily move while being maintained in parallel with the pivot shaft. This enables the pivotal motion of the headrest frame to be securely locked at least in the use position using a simple structure.

According to another aspect of the present disclosure, each of left and right elongate holes is provided in each of the left and right fixed walls. The left and right elongated holes extend toward the pivot shaft and parallel to one another. Left and right ends of the locking member are inserted in the elongated holes, and the locking member is slidably supported by the left and right fixed walls. Therefore, the locking member is supported by the left and right fixed walls using the simply structured elongated holes. Further, the locking member can move using a simple structure, while being maintained in parallel with the pivot shaft.

According to another aspect of the present disclosure, each of the left and right ends of the locking member is provided with a plate member. The plate members slidably contact the left and right fixed walls, respectively so that the plate members assist the locking member to move while maintaining the locking member being perpendicular to the left and right fixed walls. Therefore, the locking member can easily move while being maintained in parallel with the pivot shaft.

According to another aspect of the present disclosure, the bias spring is a coil spring interposed between the left and right pivotal walls. The pivot shaft is inserted in a coil portion of the bias spring. The bias spring biases directly or indirectly the left and right pivotal walls in a pivotal manner with respect to an upper part of the seatback frame. In this way, the bias spring can be arranged to have simple structure.

DETAILED DESCRIPTION

FIG. 1 to FIG. 8 show one embodiment according to the present disclosure. The present embodiment relates to a seatback 1 of a rear seat for a vehicle. Arrows in each of drawings represent respective directions of the automobile and the seatback when the seatback is mounted on a floor F of the automobile. More specifically, a front-back direction of the seatback 1 corresponds to a front-back direction of the automobile. A left-right direction of the seatback 1 is a width direction and coincides with an automobile width direction that is a left-right direction of the automobile. The following description will be provided on the basis of these directions.

Figure 1:
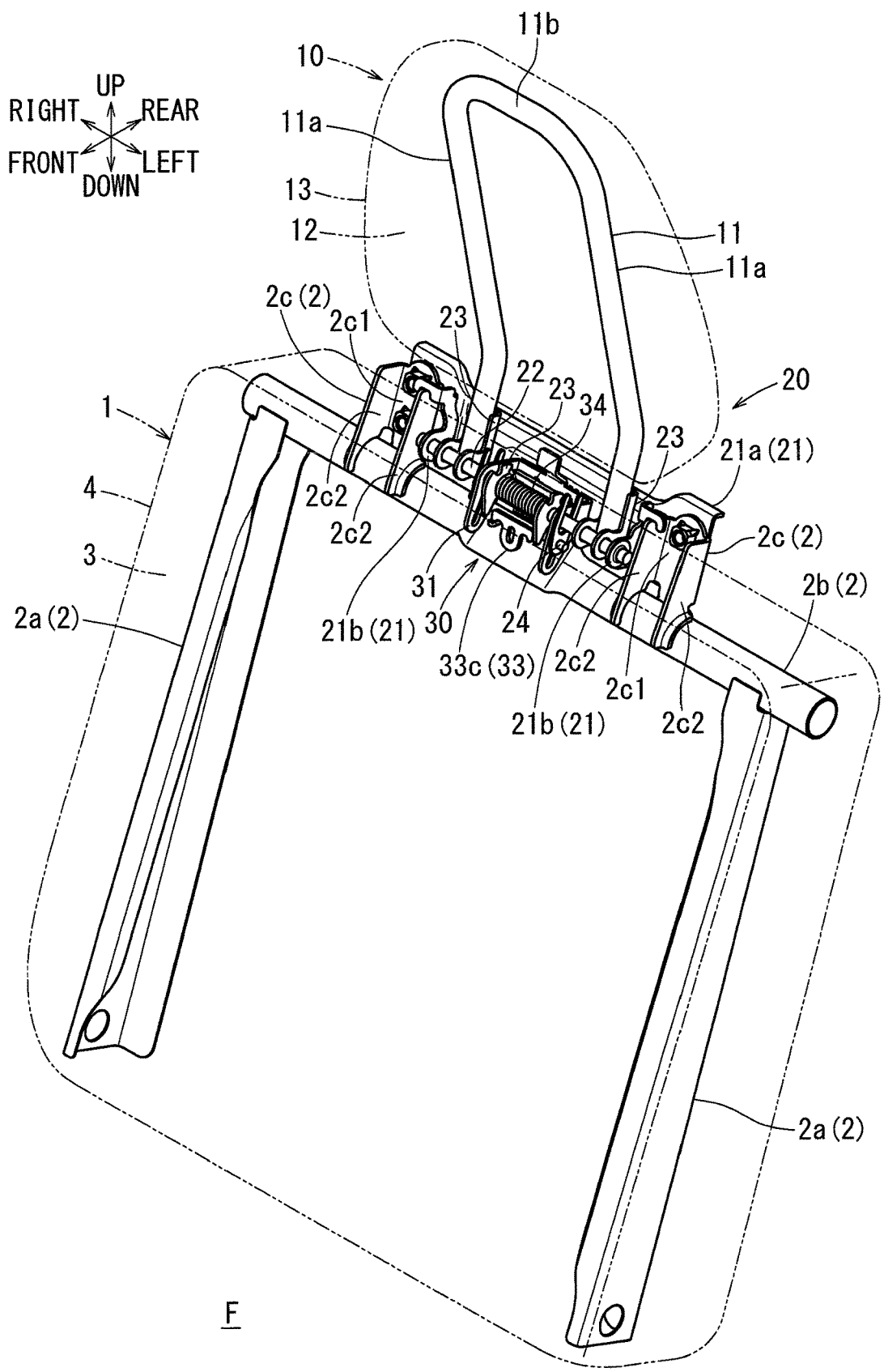
FIG. 1 is a perspective view of a headrest attached to a seatback of an automobile seat, the headrest in a use position, as viewed diagonally from the front.

As shown in FIG. 1, the seatback 1 may be configured to support a back of an occupant seated on a rear seat for an automobile. The seatback's lower end may be pivotally attached to a floor F, so as to be movable in the front-back direction. A seat cushion (not shown) for supporting the buttocks and thighs of the seated occupant may be arranged on a floor F in front of the seatback 1. The seatback 1 may be structured so as to be able to take an upright position or a reclined position. In the upright position, the seatback 1 may be upright with respect to the floor F, as shown in FIG. 1. In the reclined position, the seatback 1 may be collapsed forward so as to overlap the seat cushion. A headrest 10 for supporting a head of the seated occupant may be arranged on an upper portion of the seatback 1.

As shown in FIG. 1, the seatback 1 may include a back frame (seatback frame) 2 constituting a skeleton of the seatback 1, a back pad 3, and a back cover 4, the back cover 4 being a skin material for covering the back pad 3. The back pad 3 may be a cushion material and may generally form an outer shape of the seatback 1. The back frame 2 may be formed in substantially an inverted-U shape along the outer portion of the seatback 1, as viewed from the front when in the upright position. More specifically, the back frame 2 may include left and right side frames 2a, positioned vertically, made a steel sheet material. An upper frame 2b having a tubular shape may be connect traversing the upper ends of each of the side frames 2a. Left and right connecting brackets 2c may be connected to the upper frame 2b. A fixing bracket 21 may be attached to the pair of connecting brackets 2c. A horizontal cross-section of each of the side frames 2a may have substantially a U-shape, which opens toward the center of the seat. Each of the side frames 2a may include a front end and a rear end, both of which are bent toward the center of the seat. Each of the side frames 2a therefore has enhanced strength against bending or twisting.

Figure 2:
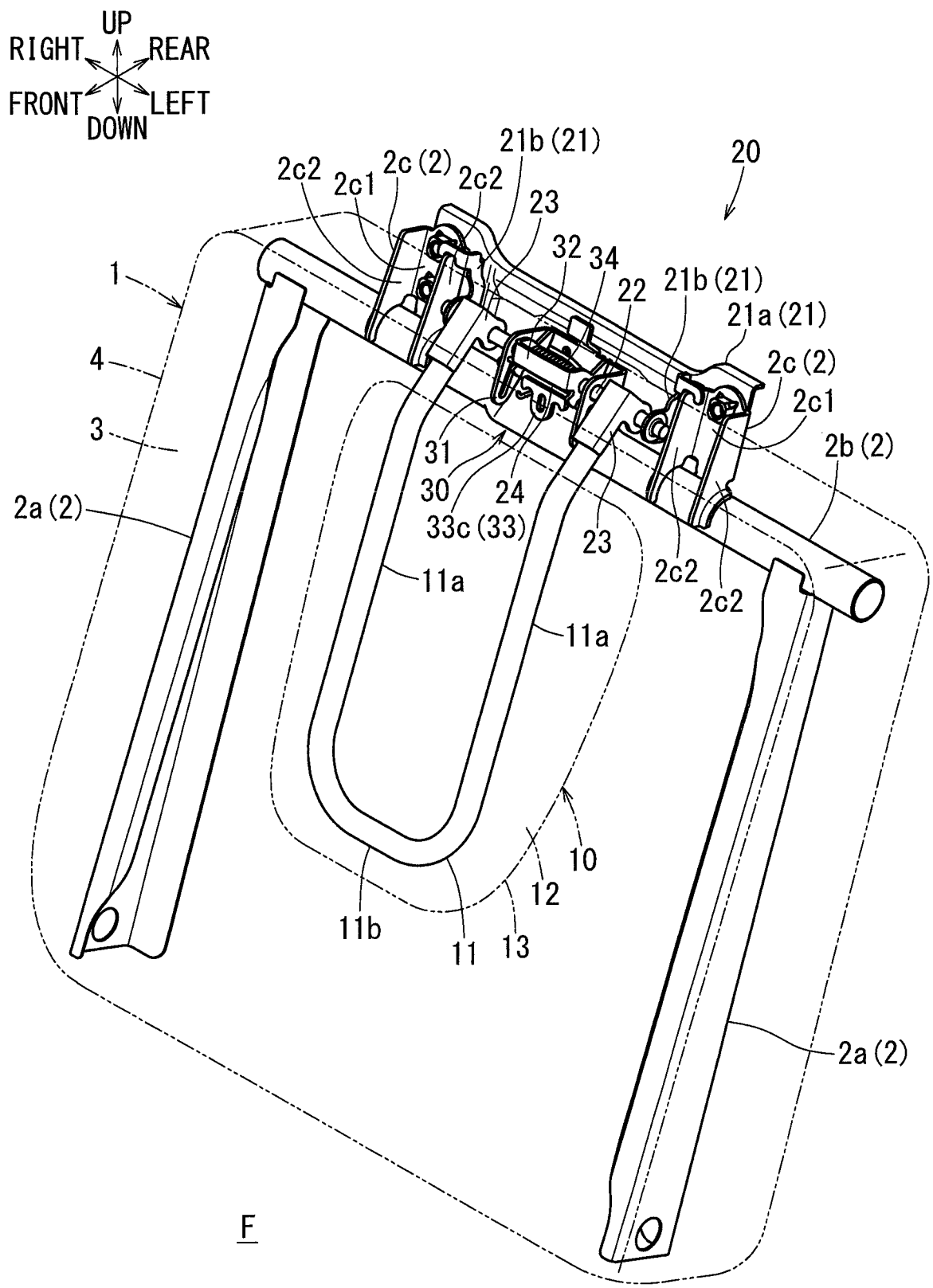
FIG. 2 is a perspective view of the seatback of the vehicle seat and of the headrest in a retracted position, as viewed diagonally from the front.

As shown in FIG. 2, the left and right connecting brackets 2c may be symmetrically positioned about the center of the seatback 1 in the left-right direction. The connecting brackets 2c may extend upward from an upper surface of the upper frame 2b, while the back frame 2 is in the upright position. The upper ends of the left and right connecting brackets 2c may be connected to each other via the fixing bracket 21. The connecting brackets 2c may each include a rear wall portion 2c1 and left and right wall portions 2c2. The rear wall portion 2c1 may have substantially a rectangular shape, extending substantially parallel to a front surface of the back frame 2. The left and right wall portions 2c2 may extend from the left and right end portions of the rear wall portion 2c1, respectively, toward the front and perpendicular to the rear wall portion 2c1. A lower end of the left and right wall portions 2c2 may be notched so as to have a circular arc shape that extends along the upper surface of the upper frame 2b. The lower ends may be connected to the upper surface of the upper frame 2b by welding.

As shown in FIG. 1 to FIG. 4, the headrest 10 may include a headrest frame 11 forming a skeleton thereof, a headrest pad 12, and a headrest cover 13, the headrest cover 13 forming a skin material that covers the headrest pad 12. The headrest pad 12 is a cushion material that covers the headrest frame 11. Further, the headrest 10 may include a tilt mechanism 20 for pivotally supporting the headrest frame 11 in the front-back direction with respect to the back frame 2. The tilt mechanism 20 locks the headrest frame 11 in the use position shown in FIG. 1 and the retracted position shown in FIG. 2, so as to not be able to pivot between these two positions. The headrest frame 11 may be a bent metal pipe. The headrest frame 11 may have substantially an inverted-U shape when the headrest 10 is in the use position and viewed from the front. The headrest frame 11 may include left and right vertical rod portions 11a and a lateral rod portion 11b. The lateral rod portion 11b may connect the upper ends of the vertical rod portions 11a. The lower end of each of the vertical rod portions 11a may be connected to the tilt mechanism 20. As shown in FIG. 1, the headrest 10 is configured to support the head of the seated occupant in the use state. As shown in FIG. 2, the headrest 10 moves toward the retracted position so as to face the seating surface of the seatback 1 and be folded with respect to the seatback 1.

Figure 3:
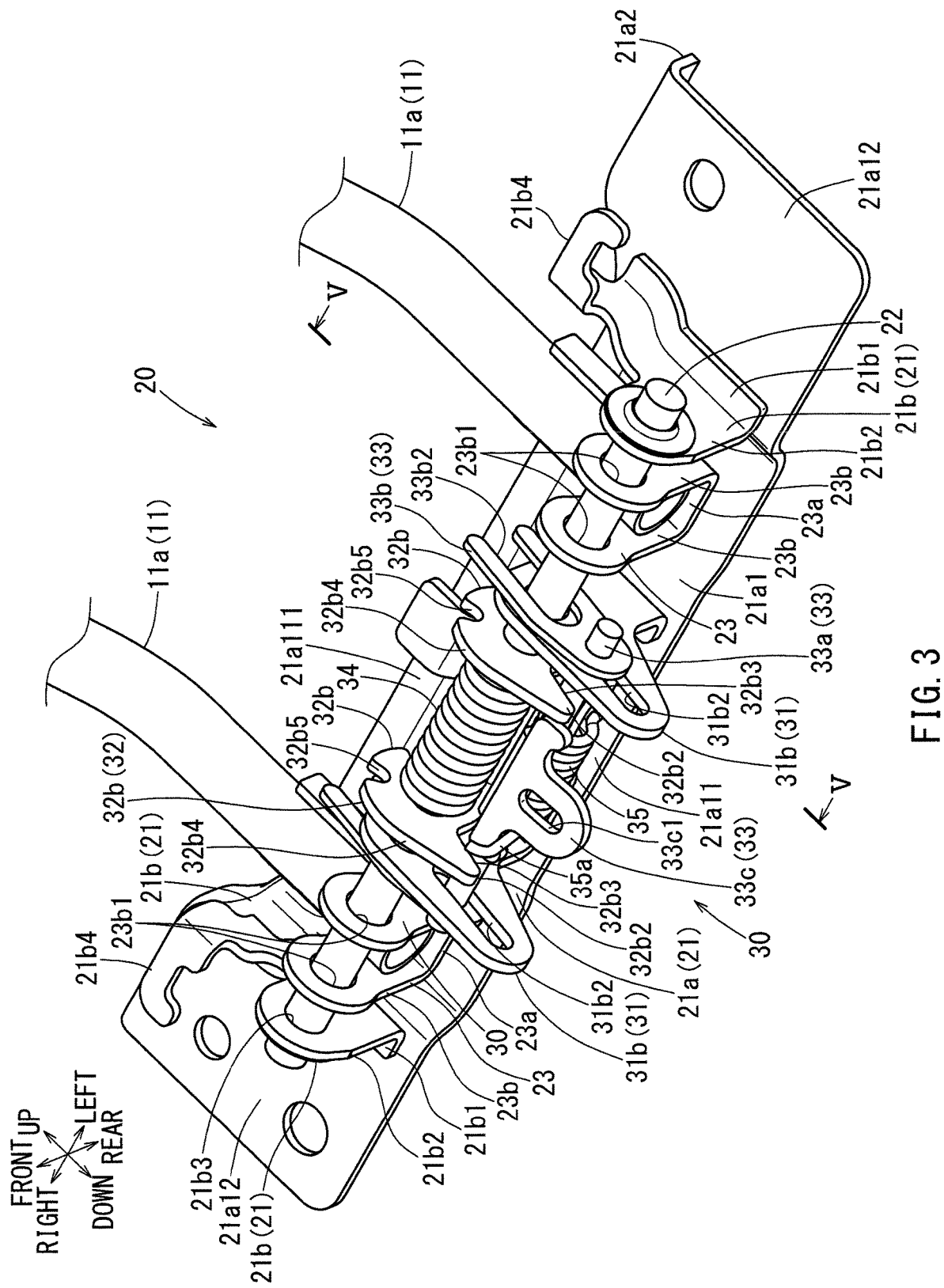
FIG. 3 is a perspective view of a tilt mechanism of the headrest, the headrest being in the use position.
Figure 4:
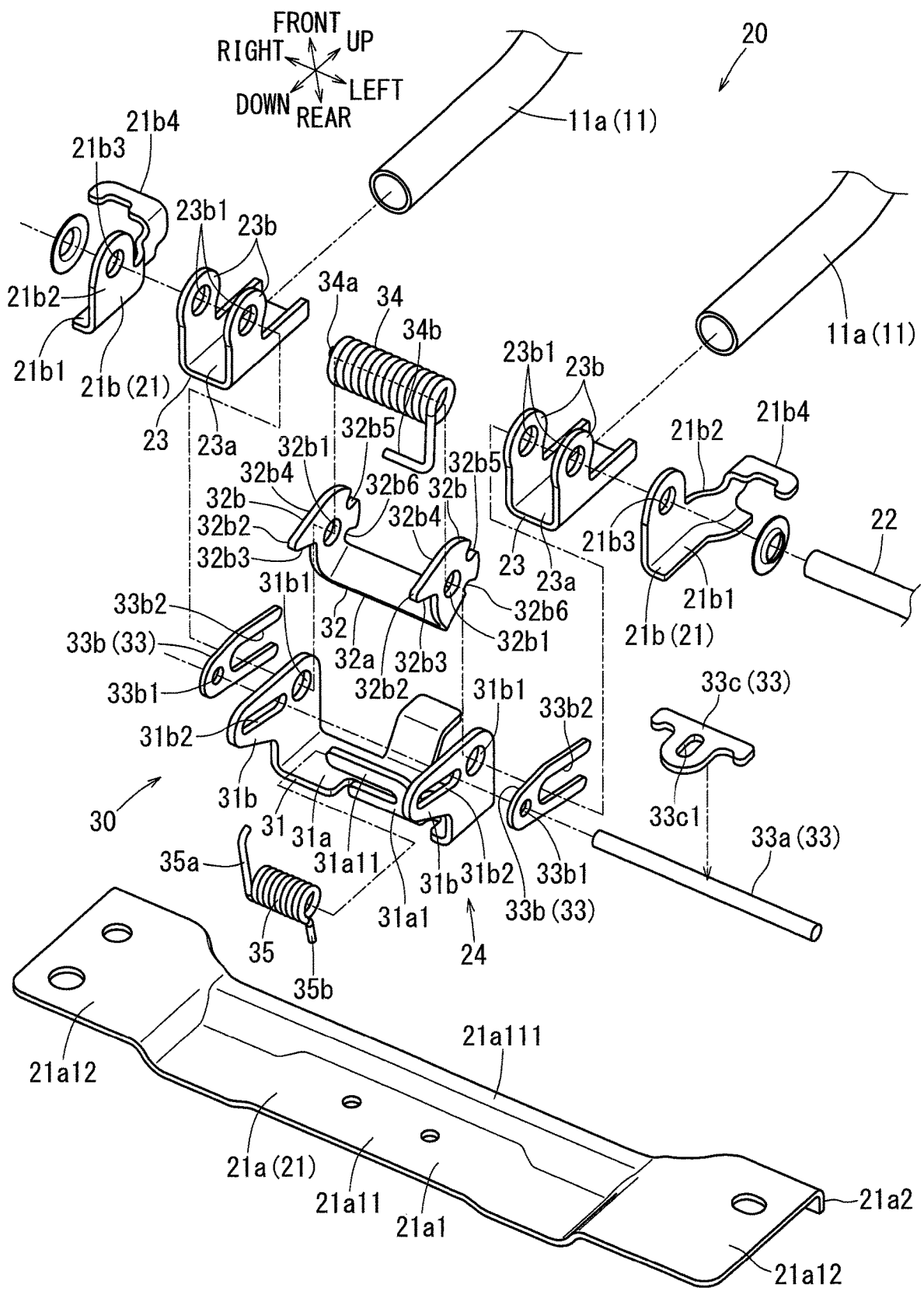
FIG. 4 is an exploded perspective view of the tilt mechanism of the headrest, when the headrest is in the use position.

As shown in FIG. 2, the tilt mechanism 20 may include fixing brackets 21 connected to the connecting brackets 2c. As shown in FIG. 3 and FIG. 4, a pivot shaft 22 may be pivotally attached to the fixing brackets 21. Right and left pivotal brackets 23 may be supported by the pivot shaft 22. The tilt mechanism 20 may include a locking mechanism 30 that serves to lock and unlock the pivotal motion of the pivot shaft 22 with respect to the connecting brackets 2c.

As shown in FIG. 3 and FIG. 4, the fixing brackets 21 may include a substantially rectangular base portion 21a and left and right pivot shaft supporting portions 21b. The left-right direction of the base portion 21a may be a major axis direction in the use state of the headrest 10. The left and right pivot shaft supporting portions 21b may be symmetrically arranged with respect to the left-right center line of the base portion 21a. The base portion 21a may include a substantially planar base plate portion 21a1 and projecting wall portions 21a2 extending backward from the upper end of the base plate portion 21a1. The base plate portion 21a1 may extend substantially parallel to a front surface of the back frame 2. In the center of the base plate portion 21a1, an intermediate recessed portion 21a11 may be formed that is recessed backward. Connecting portions 21a12 may be formed on the left and right ends of the base plate portion 21a1. The rear side of connecting portions 21a12 may come in contact with the back wall portions 2c1 of the connecting brackets 2c and may be connected by bolts and nuts. A protruding portion 21a111 that protrudes forward may be formed at the upper end of the intermediate recessed portion 21a11.

As shown in FIG. 3 and FIG. 4, since the pair of pivot shaft supporting portions 21b may be formed to have symmetrical shapes, only the left pivot shaft supporting portion will be representatively described. The pivot shaft supporting portion 21b may be formed in generally an L-shape. The pivot shaft supporting portion 21b may have an attachment plate portion 21*b*1 and a support plate portion 21*b*2. The attachment plate portion 21*b*1 may extend parallel to a connecting portion 21*a*12 of the base plate portion 21*a*1. The support plate portion 21*b*2 may extend forward from the right end of the attachment plate portion 21*b*1 and perpendicular to the attachment plate portion 21*b*1. A pivot shaft hole 21*b*3 may pass through a lower front portion of the support plate portion 21*b*2 in the left-right direction. A pivot shaft 22, which may have a columnar shape extending in the left-right direction, may be inserted in the pivot shaft hole 21*b*3 such that the pivot shaft 22 pivotally supports the support plate portion 21*b*2. An engagement portion 21*b*4 may be formed at an upper front end portion of the support plate portion 21*b*2 so as to extend to the left. The engagement portion 21*b*4 may engage the upper end of at least one of right and left wall portions 2*c*2 (see FIG. 1) when a fixing bracket 21 is attached to the connecting bracket 2*c*. Each of the pivot shaft supporting portions 21*b* may be connected to a front surface of a base plate portion 21*a*1, for example by welding. A distance between inner surfaces of the right and left support plate portions 21*b*2 in the width direction may be greater than the distance between the outer surfaces of the right and left vertical rod portions 11*a* in the width direction.

Figure 5:
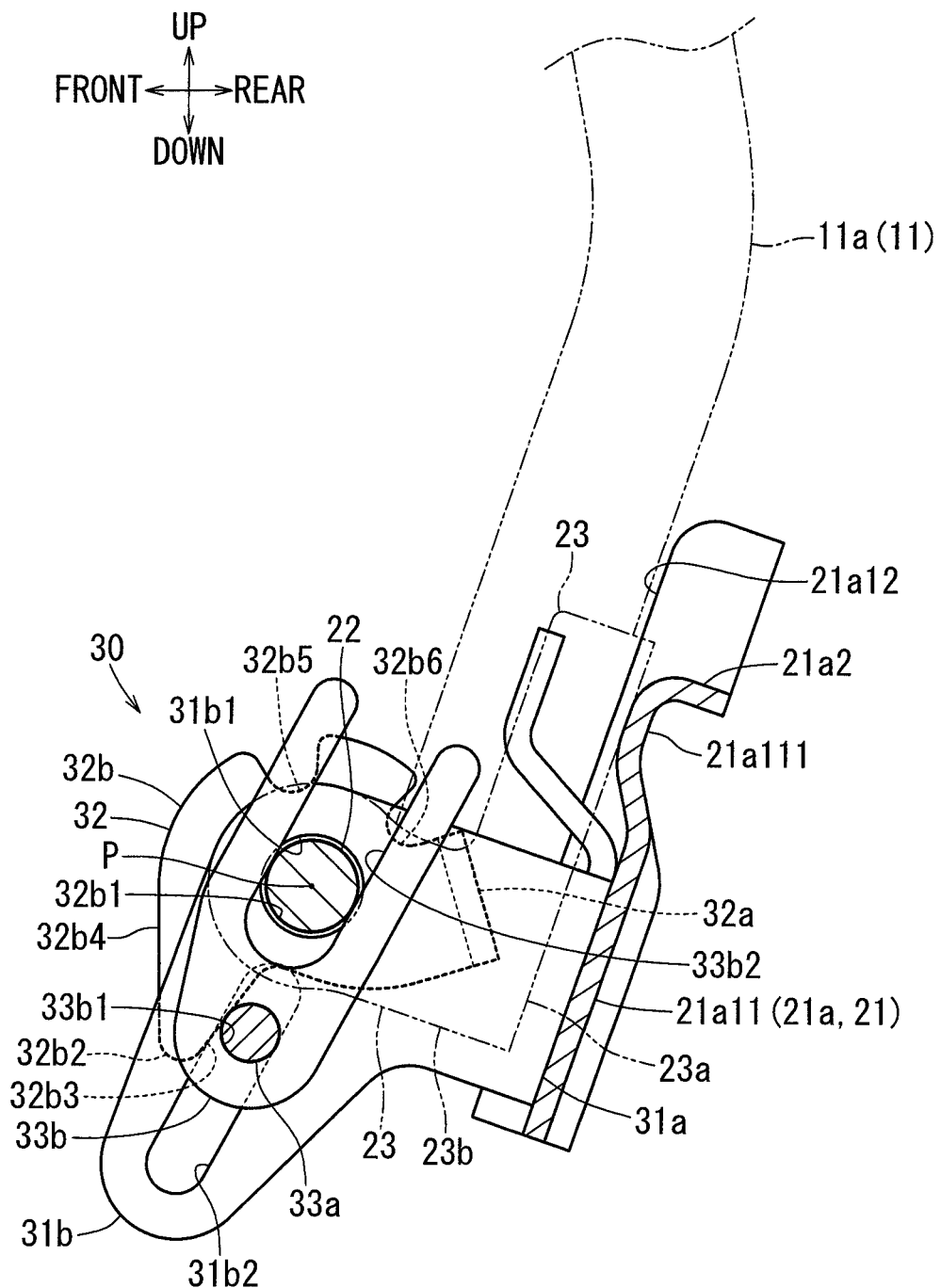
FIG. 5 is a cross-sectional view taken along the V-V line of FIG. 3, illustrating a locked state.
Figure 6:
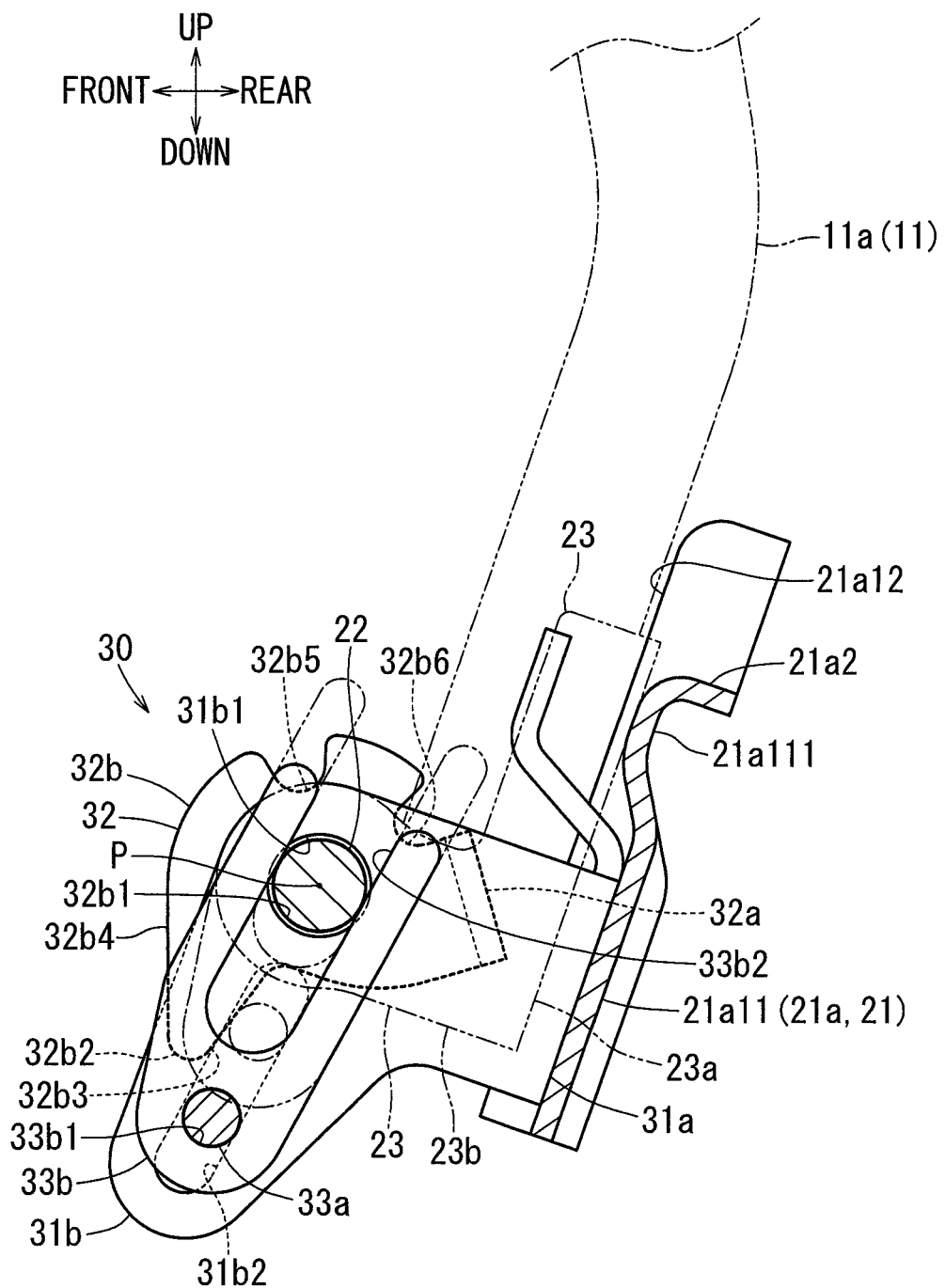
FIG. 6 is a view illustrating an unlocked state in the cross-sectional view of FIG. 5.

As shown in FIG. 3 and FIG. 4, each of the pivotal brackets 23 may have a U-shaped cross section and may include a flat plate portion 23*a* and right and left upright plate portions 23*b*. The flat plate portion 23*a* may extend parallel to a lower side portions of the connecting portion 21*a*12 and the intermediate recessed portion 21*a*11 while the headrest 10 is in the use position. The right and left upright plate portions 23*b* may extend forward from both the right and left ends of the flat plate portion 23*a* and perpendicularly to the flat plate portion 23*a*. The flat plate portion 23*a* may have generally a rectangular shape when viewed from the front. The length of the flat plate portion 23*a* in the left-right direction may be slightly greater than the diameter of the vertical rod portion 11*a* of the headrest frame 11. The length of the flat plate portion 23*a* in the up-down direction may be about twice its length in the left-right direction. Pivot shaft holes 23*b*1, into which the pivot shaft 22 is inserted and fixed so as to extend in the left-right direction, may be formed in the lower front portions of each of the upright plate portions 23*b*. The pivotal brackets 23 may be attached to the lower end portions of the right and left vertical rod portions 11*a* of the headrest frame 11. For example, the pivotal brackets 23*a* may be welded to the right and left vertical rod portions 11*a* while the inner surfaces of the flat plate portion 23*a* and the pair of the right and left vertical plate portions 23*b* are abutted to the surface of the vertical rod portions 11*a*. As shown in FIG. 5, each of the pivotal brackets 23 may be pivotally biased about the pivot shaft 22 in a clockwise direction, for instance by a later described pivot member biasing spring 34. A pivotal motion in the clockwise direction is stopped when the rear surface of the flat plate portion 23*a* abuts the front surface of the protruding portion 21*a*111 of the fixing bracket 21, for instance while the headrest 10 is in the use position.

As shown in FIG. 3 and FIG. 4, the locking mechanism 30 may include a fixing member 31 fixed to the base portion 21*a* and a pivot member 32 fixed to the pivot shaft 22. Further, the locking mechanism 30 may include a lock body 33 configured to lock and unlock the pivotal motion of the pivot member 32, with respect to the fixing member 31. Furthermore, the locking mechanism 30 may include a pivot member biasing spring 34 and a locking member biasing spring 35. The pivot member biasing spring (bias spring) 34 pivotally biases the pivot member 32 with respect to the fixing member 31. The locking member biasing spring 35 biases the lock body 33 with respect to the fixing member 31.

As shown in FIG. 3 and FIG. 4, the fixing member 31 may have substantially a U-shaped cross section and may include a base wall portion 31*a* and right and left lateral wall portions 31*b*. The base wall portion 31*a* may have a planar shape extending in the left-right direction. The right and left lateral wall portions 31*b* may extend forward from the right and left ends of the base wall portion 31*a* and perpendicularly to the base wall portion 31*a*. The length of the base wall portion 31*a* in the left-right direction may be less than the distance between the inner sides of the vertical rod portions 11*a* of the headrest frame 11 in the left-right width direction of the headrest 10. A locking portion 31*a*1 extending forward may be formed at the lower end of the base wall portion 31*a*. A spring insertion portion 31*a*11 extending in parallel to the base wall portion 31*a* and in the left-right direction may be formed at the locking portion 31*a*. A through hole 31*b*1, into which the pivot shaft 22 may be inserted in the left-right direction so as to pivotally supported, may be coaxially formed in each of the right and left lateral wall portions (fixing wall portions) 31*b*. Further, an elongated hole 31*b*2, of which the longitudinal axial direction may extend parallel to a radial direction from the central axis of the through hole 31*b*1 to a substantially lower front direction, is formed in each of the right and left lateral wall portions 31*b*. The right and left elongated holes 31*b*2 coincide with one another when viewed from the left-right direction. The fixing member 31 may be fixed to the base portion 21*a* while a rear surface of the base wall portion 31*a* is abutted to the front surface of the center of the base portion 21*a* in the left-right direction. At this time, each of the pivot shaft holes 21*b*3 in each of the pivot shaft supporting portions 21*b* coincides with each of the through holes 31*b*1 in each of the lateral wall portions 31*b* when viewed from the left-right direction.

As shown in FIG. 3 and FIG. 4, the pivot member 32 may have a U-shaped cross-section. The pivot member 32 may include a base plate portion 32*a* as well as right and left lateral plate portions (pivotal wall portion(s)) 32*b*. The base plate portion 32*a* may have a planar shape extending in the left-right direction. The right and left lateral plate portions 32*b* may extend from the respective right and left ends of the base plate portion 32*a* and perpendicular to the base plate portion 32*a*. The length of the base plate portion 32*a* in the left-right direction may be slightly less than the length of the base portion 31*a* of the fixing member 31 in the left-right direction. The pivot member 32 may be mounted on the fixing member 31. As a result, the outer surfaces of the pair of the right and left lateral plate portions 32*b* may come slidably in contact with the inner surfaces of the pair of the right and left lateral wall portions 31*b*, or may be spaced apart from the inner surfaces. As shown in FIG. 5, the right and left lateral plate portions 32*b* may have essentially the same shape and may be provided with through holes 32*b*1 in substantially the center thereof, the through holes 32*b*1 passing through in the left-right direction. The through holes 32*b*1 of the right and left lateral plate portions 32*b* may be coaxially located and the pivot shaft 22 may be inserted in the right and left through holes 32*b*1. Top portions 32*b*2 may be positioned farthest apart from an axis P in a radial direction, the axis P passing through the through holes 32*b*1 formed in the lower front portion of each of the lateral plate portions 32*b*. A surface adjacent the top portion 32*b*2 in the counterclockwise direction about the axis P of FIG. 5 may be formed as a first engagement portion 32*b*3. A surface adjacent the top portion 32b2 in the clockwise direction about the axis P of FIG. 5 may be formed as a slide portion 32b4. A second engagement portion 32b5 may be formed at an end of the slide portion 32b4 opposite to the top portion 32b2. The second engagement portion 32b5 may be formed on the side of the right and left lateral plate portions 32b opposite the first engagement portion 32b3 across the axis P. The second engagement portion 32b5 may be recessed in a circumferential direction, toward the axis P. Further, a spring lock portion 32b6 may be formed at a position distant from the second engagement portion 32b5 in the clockwise direction in FIG. 5, about the axis P. The spring lock portion 32b6 may be recessed in the circumferential direction, toward the axis P. One arm 34a of the pivot member biasing spring 34, which will be described later, may be locked in the spring lock portion 32b6 of the right lateral plate portion 32b. The first engagement portion 32b3, the slide portion 32b4, and the second engagement portion 32b5 will also be described later in detail.

As shown in FIG. 3 and FIG. 4, the lock body 33 may include a columnar member (locking member) 33a, right and left control members (plate members) 33b, and a wire locking member 33c. The columnar member 33a may be a rod body extending in the left-right direction and may have a circular cross-section. The control members 33b may have a plate-like shape and may be connected to the right and left ends of the columnar member 33a. The wire locking member 33c may be attached to the columnar member 33a to lock one end of the operation wire (not shown) to the columnar member 33a. A diameter of the columnar member 33a may be set to be slightly less than the length of the shorter axis of each of the elongated holes 31b2 of the fixing member 31. Further, the diameter of the columnar member 33a may be set to have a size enabling it to be engaged in each of the second engagement portions 32b5 of the pivotal member 32. The length of the columnar member 33a in the left-right direction may be slightly greater than the length of the base wall portion 31a of the fixing member 31 in the left-right direction. When mounting the lock body 33 to the fixing member 31, the right and left ends of the columnar member 33a may project out from the outer surface of the pair of the right and left lateral wall portions 31b by an amount equal to the plate thickness of the control member 33b. A through hole 33b1 may be formed in one end of each of the control members 33b and a guide groove 33b2 may be formed in the other end. The through holes 33b1 may penetrate the control member 33b in the left-right direction and the columnar member 33a may be inserted in the through holes 33b1. The guide grooves 33b2 may have substantially a U-shape, which penetrates in the left-right direction and opens toward a direction opposite the through holes 33b1. The width of the guide grooves 33b2 may be slightly greater than the diameter of the pivot shaft 22. The columnar member 33a may be inserted in each of the elongated holes 31b2 of the fixing member 31. When each of the control members 33b is connected to the corresponding left and right ends of the columnar member 33a, the guide grooves 33b2 in each of the control members 33b are aligned, as viewed from the left-right direction. The pivot shaft 22 may be arranged in the guide grooves 33b2 of the control members 33b. Therefore, the columnar member 33a can move toward or away from the pivot shaft 22, while substantially maintaining a parallel state to the pivot shaft 22. At this time, the inner surface of each of the control members 33b in the left-right width direction of the headrest 10 may slidably contact the outer surface of each of the lateral wall portions 31b of the fixing member 31. The wire locking member 33c may be connected to the columnar member 33a by welding. One end of the operation wire (not shown) may be engaged in a wire attachment portion 33c1 of the wire engagement member 33c. The other end of the operation wire may be pulled from outside the seatback 1. As a result, the columnar member 33a may move with respect to the fixing member 31 against the biasing force of the locking member biasing spring 35, which will be described later.

As shown in FIG. 3 and FIG. 4, the pivot member biasing spring 34 may be a torsion coil spring. The pivot member biasing spring 34 may be arranged so that the portion of the pivot shaft 22 corresponding to a part between the lateral plate portions 32b of the pivot member 32 is inserted inside the coil portion of the pivot member biasing spring 34. One arm 34a of the pivot member biasing spring 34 may be locked in the spring locking portion 32b6 of the right lateral plate portion 32b of the pivot member 32. The other arm 34b may be locked in a part of the base wall portion 31a of the fixing member 31. In this way, the pivotal member 32 can be pivotally biased about an axis including the pivot shaft 22, for instance in the counterclockwise direction of FIG. 5. The pivot member 32 may be connected to the pivot shaft 22. The pivot shaft 22 may be connected to the headrest frame 11 via the right and left pivotal brackets 23. Accordingly, the headrest frame 11 is pivotally biased with respect to the fixing member 31, so as to pivot about an axis including the pivotal shaft 22. The headrest frame 11 and the pivot member 32 may be biased together in the retracting direction.

As shown in FIG. 5, the lock member biasing spring 35 may be a torsion coil spring. A spring insertion portion 31a11 of the fixing member 31 is arranged to be located inside a coil portion of the lock member biasing spring 35. One arm 35a of the lock member biasing spring 35 is locked with the lower side of the columnar member 33a of the lock body 33. The other arm 35b is locked at the lower end of the base wall portion 31a of the fixing member 31. The lock body 33 is thereby biased in a direction approaching the pivot shaft 22, when the columnar member 33a is inserted in the elongated holes 31b2 of the right and left lateral wall portions 31b. The columnar member 33a of the lock body 33 is abutted to the first engagement portion 32b3 of the pivot member 32 when the headrest 10 is in a use position, so as to prevent the headrest 10 from being pivoted in the retracted direction.

As shown in FIG. 5, the columnar member 33a of the lock body 33 may be abutted to the right and left first engagement portions 32b3 of the pivot member 32. In this state, the right and left first engagement portions 32b3 may be inclined with respect to front peripheral edges of the right and left elongated holes 31b2, for instance at an angle of 4 to 6 degrees in a clockwise direction. The columnar member 33a of the lock body 33 may be biased by the lock member biasing spring 35 in a direction approaching the pivot shaft 22. Therefore, the columnar member 33a presses the first engagement portion 32b3 to allow the pivot member 32 to rotate clockwise about an axis including the pivot shaft 22. Further clockwise pivotal motion of the pivot shaft 22 is stopped as rear surfaces of the flat plate portion 23a of each of the pivotal brackets 23 abut the front surface of the protruding portion 21a111 of the fixing bracket 21. This state is a use position of the headrest 10.

Figure 7:
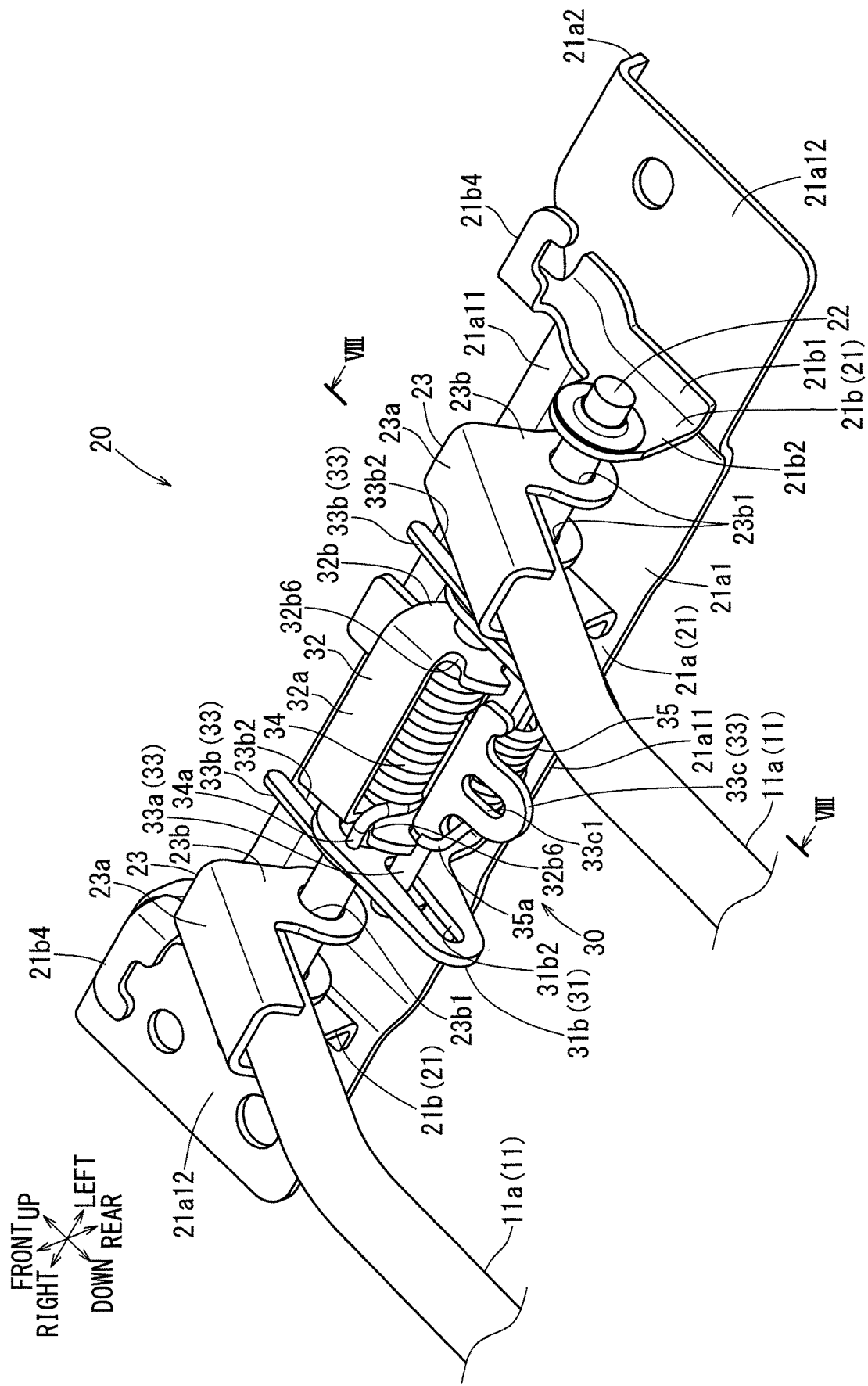
FIG. 7 is a perspective view of the tilt mechanism of the headrest in the retracted position.
Figure 8:
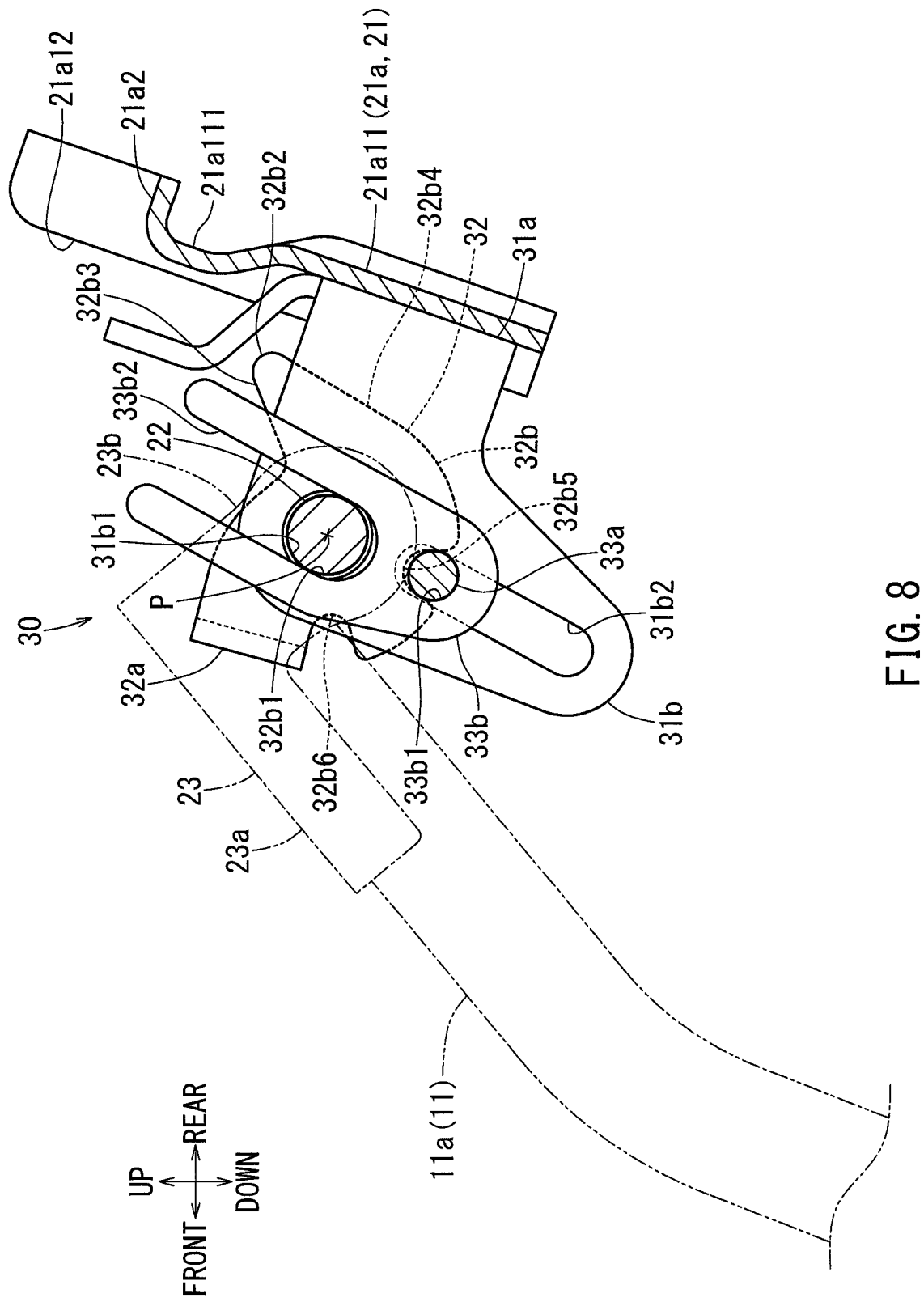
FIG. 8 is a cross-sectional view taken along the VIII-VIII line of FIG. 7.

An operation of the tilt mechanism 20 will be described with reference to FIG. 3 to FIG. 8. In FIG. 3 and FIG. 5, a locked state of the lock mechanism 30 is shown in the use position of the headrest 10. More specifically, the columnar member 33a of the lock body 33 may be abutted to each of the first engagement portions 32b3 of the pivot member 32. This prevents the headrest 10 from being pivoted about the pivot shaft 22 toward the retracted position. In this locked state, the other end of an operation wire may be pulled. The columnar member 33a of the lock body 33 thus moves against the biasing force of the lock member biasing spring 35, generally in a direction moving away from the pivot shaft 22. Accordingly, the columnar member 33a is brought into the state shown in FIG. 6. In this state, the abutment state of the columnar member 33a of the lock body 33 may be released from the first engagement members 32b3 of the pivot member 32. Accordingly, the pivot member 32 is biased to pivot, in the counterclockwise direction of FIG. 6, about an axis including the pivot shaft 22 due to the rotation biasing force of the pivot member biasing spring 34. The headrest frame 11 is accordingly pivoted with and about the pivot shaft 22 toward the retracted position. At this moment, the columnar member 33a of the lock body 33 may slidably move along, while being abutted to, the slide portions 32b4 of the pivot member 32, due to the lock member biasing spring 35. Subsequently, the columnar member 33a enters the second engagement portion 32b5, due to the lock member biasing spring 35. With the columnar member 33a being engaged with the second engagement portions 32b5, the pivotal motion of the pivot member 32 stops, so as to be brought into a state shown in FIG. 7 and FIG. 8. FIG. 7 and FIG. 8 show the state in which the tilt mechanism 20 is in a retracted position. As shown in FIG. 2, a head portion support surface of the headrest 10 may be abutted to the seating surface of the seatback 1. With the headrest 10 in the retracted position, the seatback 1 may be collapsed toward the side of a floor F so as to take a collapsed position. This makes it possible to ensure a wide space behind the seatback 1 for easier entry into the vehicle. With the headrest 10 still in the retracted position, the seatback 1 may be raised so as to take a raised position. The headrest 10 may be brought into the use state from this raised position by performing an operation in a reverse order of that described above. More specifically, the headrest may be manually rotated about an axis including the pivot shaft 22 in the clockwise direction of FIG. 8, against the rotational biasing force of the pivot member biasing spring 34. As a result, rear surfaces of the flat plate portion 23a of the right and left pivotal brackets 23 may be abutted to a front surface of the protruding portion 21a111 of the fixing bracket 21, such that the pivotal motion is stopped. During this operation, the columnar member 33a of the lock body 33 slidably moves along, while being abutted to, each of the slide portions 32b4 of the pivot member 32. The columnar member 33a travels over the top portions 32b2 and is subsequently engaged with the first engagement portions 32b3 of the right and left lateral plate portions 32b. The columnar member 33a of the lock body 33 may be disengaged from each of the second engagement portions 32b5, against biasing force of the lock member biasing spring 35, without pulling the other end of the operation wire. The headrest 10 may be manually rotated about the pivot shaft 22 from the retracted position to a use position. When the headrest 10 is being manually rotated, the columnar member 33a of the lock body 33 may be disengaged from the second engagement portions 32b5 by using a contour of each of the second engagement portions 32b5. The columnar member 33a pushes against each of the first engagement portions 32b3, using the biasing force of the lock member biasing spring 35. As a result, the pivot member 32 is rotated, clockwise in FIG. 5, about an axis including the pivot shaft 22. The right and left pivotal brackets 23 are therefore held in the use position by the protruding portion 21a111 of the fixing bracket 21 and the pivot shaft 22, thereby suppressing wobbling.

The present embodiments structured as mentioned above may provide at least the following operational effects. The columnar member 33a of the lock body 33 may bridge the right and left lateral wall portions 31b of the fixing member 31 as well as bridge the right and left lateral plate portions 32b of the pivot member 32. The lateral wall portions 31b and the lateral plate portions 32b may be arranged between the open end sides of the headrest frame 11. When the columnar member 33a of the lock body 33 moves so as to be close to the pivot shaft 22, the columnar member 33a comes in contact with the peripheral edges of the pair of the elongated holes 31b2 of the fixing member 31, as well as the pair of the right and left first engagement portions 32b3 of the pivot member 32. This allows the columnar member 33a to lock the locking mechanism 30 in a non-pivotal manner. The columnar member 33a of the lock body 33 may have a length corresponding to less than the interval between the open end sides of the headrest frame 11. Due to the columnar member 33a having a length insufficient to bridge the open end sides of the headrest frame 11, the columnar member 33a can be easily movably supported while maintaining a state in parallel to the pivot axis 22. This ensures the pivotal motion of the headrest frame 11 can be locked in the use state with a simple structure.

The right and left ends of the columnar member 33a of the lock body 33 may be inserted in the pair of the right and left elongated holes 31b2 of the fixing member 31. The columnar member 33a may be slidably supported by the fixing member 31, thus allowing it to move while maintaining a parallel state with the pivot shaft 22, all while using a simple structure. Further, the pair of right and left control members 33b may be arranged at the right and left ends of the columnar member 33a of the lock body 33 so as to slidably contact the outer surface of each of the lateral wall portions 31b of the fixing member 31. This allows the columnar member 33a of the lock body 33 to move while maintaining a parallel state with the pivot shaft 22.

This disclosure has been described with respect to specific embodiments. However, the present invention shall not be limited to the appearance and the configuration described in the above embodiments, and various modifications, additions, and/or deletions are possible without departing from a gist of the invention. For example, the following variant may be possible.

According to the above-described embodiments, the pivot member biasing spring 34 may be a torsion coil spring. A part of a pivot shaft 22 may be arranged inside a coil portion of the pivot member biasing spring 34. This portion of the pivot shaft 22 may be the portion corresponding to a part between the lateral plate portions 32b of the pivot member 32. However, not limited thereto, the pivot member biasing spring 34 may be arranged so that a portion of the pivot shaft 22 other than the portion corresponding to the part between the lateral plate portions 32b of the pivot member 32 is arranged inside the coil portion. The other portion of the pivot member biasing spring 34 may be positioned in a part other than the part corresponding to the interval between the lateral plate portions 32b of the pivot member 32 of the pivot shaft 22. In this case, as long as the pivot member biasing spring 34 can bias the pivot shaft 22 with respect to the fixed brackets 21, the parts where the spring arms are fixed may be provided at any location.

In the above-described embodiments, the present invention is adopted to seats for an automobile, however, it may also be adopted to seats mounted in an airplane, a ship, and/or a train, etc.

What is claimed is:

1. A headrest attached to a vehicle seat so that the headrest can pivot between a use state and a retracted state, the headrest comprising:
    a pivot shaft extending in a seat width direction, the pivot shaft being directly or indirectly supported by an upper part of a seatback frame in a pivotal manner;
    a headrest frame having left and right ends connected to the pivot shaft; and
    a locking mechanism provided on the pivot shaft between the left and right ends of the headrest frame, the locking mechanism including:
        left and right fixed walls through which the pivot shaft extends, the left and right fixed walls being directly or indirectly fixed to the upper part of the seatback frame and extending in a direction perpendicular to the seat width direction,
        left and right pivotal walls connected to the pivot shaft, the left and right pivotal walls being located on an inner side of the left and right fixed walls and extending in parallel to the left and right fixed walls,
        a locking member configured to lock the left and right pivotal walls with respect to the left and right fixed walls so that the left and right pivotal walls do not pivot at least when in a use position, and
        a bias spring configured to pivotally bias the headrest frame in a direction toward a retracted position,
        wherein the locking member has a rod shape and is movably supported with respect to the left and right fixed walls while being maintained in parallel with the pivot shaft, so that when the locking member approaches the pivot shaft, the locking member comes in contact with a part of the left and right fixed walls and a part of the left and right pivotal walls, and consequently, the headrest is locked in a non-pivotal manner by the locking member.

2. The headrest according to claim 1, wherein:
    the left and right fixed walls are respectively provided with left and right elongate holes,
    the left and right elongated holes extend parallel to one another, and
    left and right ends of the locking member are respectively inserted in the left and right elongated holes so that the locking member is slidably supported by the left and right fixed walls.

3. The headrest according to claim 1, wherein each of left and right ends of the locking member is provided with a plate member, the plate members slidably contacting the respective left and right fixed walls, so that the plate members assist the locking member move while maintaining the locking member perpendicular to the left and right fixed walls.

4. The headrest according to claim 1, wherein the bias spring is a coil spring interposed between the left and right pivotal walls, the pivot shaft being inserted in a coil portion of the bias spring, the bias spring directly or indirectly biasing the left and right pivotal walls with respect to the upper part of the seatback frame.

5. The headrest according to claim 1, wherein the locking mechanism is provided entirely between the left and right ends of the headrest frame.

6. The headrest according to claim 1, wherein the locking member has a length less than a distance between the left and right ends of the headrest frame.

7. The headrest according to claim 1, wherein the pivot shaft is structured to pivot within the left and right fixed walls.

8. A headrest that can pivot between a use state and a retracted state, the headrest comprising:
    a pivot shaft rotatably supported by an upper part of a seatback frame so as to be rotatable about a pivot axis;
    a headrest frame having left and right ends connected to the pivot shaft so as to be pivotal about the pivot axis;
    a locking member slidably supported so as to be slidable in a direction perpendicular to the pivot axis.

9. The headrest according to claim 8, wherein the locking member is slidably supported by a fixing member so as to prevent the locking member from pivoting about the pivot axis of the pivot shaft.

10. The headrest according to claim 8, wherein the pivot shaft and the headrest frame are structured to concurrently pivot about the pivot axis.

11. The headrest according to claim 9, wherein left and right ends of the locking member are respectively inserted in left and right elongated holes of the fixing member so that the locking member is non-pivotally supported about the pivot axis by the left and right elongated holes.

12. The headrest according to claim 8, wherein the locking member does not pivot about the pivot axis while the headrest frame pivots about the pivot axis.

13. The headrest according to claim 8, wherein the locking member has a length shorter than a length between the left and right ends of the headrest frame.

14. The headrest according to claim 8, further comprising a pivot member supported by the pivot shaft so as to be concurrently pivotal with the pivot shaft about the pivot axis,
    wherein the locking member slides along an outer surface of the pivot member while the pivot member pivots about the pivot axis.

15. The headrest according to claim 8, wherein:
    the headrest frame comprises left and right vertical rod portions and a lateral rod portion connecting ends of the left and right vertical rod portions, the lateral rod portion extending in a direction parallel to the pivot axis.

16. A headrest that can pivot between a use state and a retracted state, the headrest comprising:
    a pivot shaft rotatably supported by an upper part of a seatback frame so as to be rotatable about a pivot axis;
    a headrest frame having left and right ends connected to the pivot shaft;
    left and right pivotal walls connected to the pivot shaft so as to be concurrently pivotal with the pivot shaft about the pivot axis; and
    a locking member slidably supported so as to be slidable in a direction perpendicular to the pivot axis while contacting the left and right pivotal walls.

17. The headrest according to claim 16, wherein the locking member has a length shorter than a length between the left and right ends of the headrest frame.

18. The headrest according to claim 17, wherein a distance between left and right pivotal walls is less than the length of the locking member.

19. The headrest according to claim 16, wherein each of left and right ends of the locking member is provided with a plate member, the plate members being configured to concurrently slide with the locking member in the direction perpendicular to the pivot axis when the left and right pivotal walls pivot about the pivot axis.

* * * * *